W. P. PENN.
Grain Drill.
No. 26,611.  Patented Dec. 27, 1859.
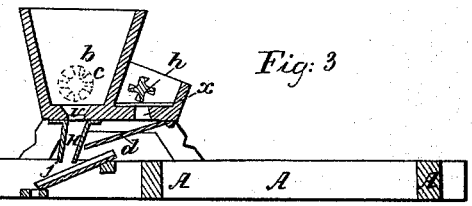
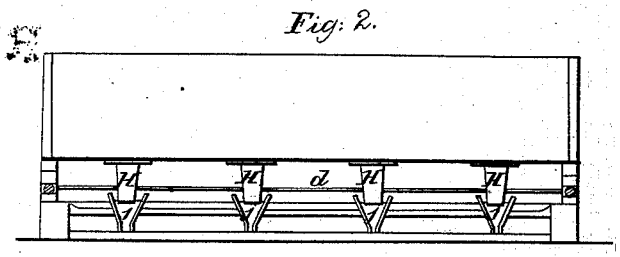
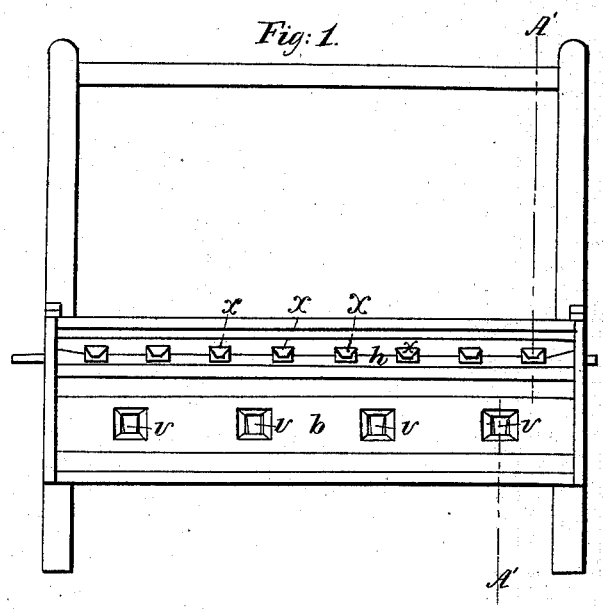

UNITED STATES PATENT OFFICE.

WORDEN P. PENN, OF BELLEVILLE, ILLINOIS.

IMPROVEMENT IN SEEDING-MACHINES.

Specification forming part of Letters Patent No. 26,611, dated December 27, 1859.

*To all whom it may concern:*

Be it known that I, WORDEN P. PENN, of Belleville, in the county of St. Clair and State of Illinois, have invented a new and useful Improvement in Seeding-Machines; and I do hereby declare that the following is a full, clear, and exact description of the same, reference being had to the annexed drawings, making part of this specification, in which—

Figure 1 is a top view; Fig. 2, a front elevation, and Fig. 3 a transverse section through A A'.

My invention consists of an improved arrangement of grass-seed hopper in connection with a grain-hopper, and in combining and arranging a spreader with the grass-seed hopper, which shall spread the seed and throw it back without the aid of marking machinery of any kind; and as my invention relates only to the hopper-box and its immediate attachments I shall confine this specification to what relates to my improvement, which may be understood without reference to any other part of the machine.

Upon the drawings, $b$ is the grain-box; $a$, the feeding-wheel; $v$, a hole in the bottom of the box $b$; H, a pipe, and J a leader, through which the grain falls to the ground. In front of the grain-hopper the grass-seed hopper $i$ is placed, so as to form a part and parcel of the grain-box, as it will be seen that the front board of the grain-box forms the back board of the grass-seed box. This I deem one part of my improvement.

$h$ is the feeding-wheel in the grass-seed box, and $x$ the hole through which the grass-seed is fed upon the spreader $d$, which is secured to the under side of the said seed-box, and which is set at an angle in the manner shown, so as to throw the seed to the back part of the machine. Now, it will be seen that the hole $v$ is made with a flare in the top side, and that the hole $x$ is made with a flare in the under side. The object of making the bottom or lower part of the hole $v$ the smallest is to make the grain leave it in a small regular stream, and the object of making the hole $x$ largest at the lower side or end is to induce the seed to spread and fall scatteringly upon the reflector $d$.

I am aware that a seed-hopper has been combined with a grain-hopper before, and that machines have been contrived to do all that this machine does; but they do it in a different way—that is, by a different arrangement of devices. I do not therefore claim any of the functions performed by this machine; but

What I claim as my invention is—

Arranging the grass-seed hopper in front of the grain-hopper, with the reflector $d$ fixed against its under side in relation to the grass-seed box and the grain-box, and the pipe H and leader J, as shown and described.

W. P. PENN

Witnesses:
 AMOS BROADWAY,
 C. E. GRAY.